United States Patent [19]
Ferguson

[11] Patent Number: 5,533,005
[45] Date of Patent: Jul. 2, 1996

[54] DUAL CONNECTIONS

[75] Inventor: Stephen P. Ferguson, Coventry, England

[73] Assignee: GPT Limited, United Kingdom

[21] Appl. No.: 158,912

[22] Filed: Nov. 29, 1993

[30] Foreign Application Priority Data

Dec. 1, 1992 [GB] United Kingdom ............... 9225081

[51] Int. Cl.⁶ .................... H01L 1/20; H01L 1/22
[52] U.S. Cl. ........................................................ 370/16
[58] Field of Search ........................ 370/16, 161, 13, 370/85.15; 371/8.1, 8.2, 11.1, 11.2; 340/827

[56] References Cited

U.S. PATENT DOCUMENTS

| | | | |
|---|---|---|---|
| 4,930,119 | 5/1990 | Kobayashi et al. | 370/16.1 |
| 5,159,595 | 10/1992 | Flanagan et al. | 370/16 |
| 5,189,662 | 2/1993 | Kleine-Altekamp | 370/16 |
| 5,216,666 | 6/1993 | Stalick | 370/16.1 |

*Primary Examiner*—Wellington Chin
*Attorney, Agent, or Firm*—Kirschstein

[57] ABSTRACT

Data is protected in a data transmission system operating on the synchronous digital hierarchy. The data is transmitted in multiplex form between ports in the system and protection is applied between ports at different or the same aggregate bit rates. This protection is achieved by selecting between individual portions of the payload within the aggregate signals and each part of mutually protective portions has the same nominal traffic capacity. By duplexing an alternative signal path is created to ensure a continuity of traffic through the system in the event of a fault in one path.

4 Claims, 2 Drawing Sheets

DUAL CONNECTIONS

BACKGROUND OF THE INVENTION

1. Field of the Invention

The present invention relates to a method of protecting data in a data transmission system and is an improvement on known methods of protecting of telecommunications traffic in a transmission network, particularly but not exclusively in a network which is based on the SDH (synchronous digital hierarchy).

The invention is described in terms of digital traffic at the 2,048 kbit/s ("2 Mbit/s") rate, but can apply to any data or other traffic of any modulation scheme or information rate, provided that it has attributes similar to those in the present invention.

2. Description of the Related Art

One necessary attribute is that the data has some associated information with which the quality of the data can be checked, and which travels with the data. In the extreme case, total loss of the data would be taken as a failure of quality, but in more normal circumstances, corruption of parity or other type of digital check sequence would be an example of how quality can be measured, Signals based on the SDH contain a type of parity data (BIP, or "byte interleaved parity") which is used in this way.

The equipment in which the invention is to be used is an add-drop multiplexer (also known as an ADM or drop-insert multiplexer). An ADM provides low cost access to all or part of the traffic passing along a telecommunications bearer, such as an optical fibre. The traffic passing through does so via "line ports", and the accessed traffic passes via 'tributary ports'. It is conventional in transmission networks to provide protection against bearer failure by provision of one or more alternative bearers, which are selected either automatically or under operator control. In the former case the control is based on failure or on a quality check applied to the received signals. In the latter case it is based conventionally on reports of such conditions, passed to a central control point for operator action, The traffic in the return direction may be left undisturbed or may be switched between paths in sympathy with the direction of traffic which has experienced the fault, in order to simplify maintenance of duplex traffic equipment.

The main advantages of automatic control are that protection is generally faster, and operating costs are lower. The chief disadvantage, however, is that flexibility of rerouting is generally limited. If the flexibility automatically to choose from many alternative routes is provided, then the response is usually slow, because of the limitations of computer processing power, with the result that disturbance continues for longer after a break before restoration occurs.

The simplest example of alternative routing is selection of a standby path which may be shared by two or more working paths between the same end points. Another is the use of a ring to provide two paths, generally over diverse routes, and either path is chosen as necessary. In most cases, as in the examples just given, them is a similarity or a symmetry, or other simplifying characteristic, between the alternative paths, so that the design or operation of the control system is not too complex, and therefore, operation can be fast.

Even for more complex networks, the rules for selection of an alternative route can be made sufficiently simple for fast automatic rerouting to be provided, generally by the operator pre-assigning a sub-set of the possible mutes, from which the control system selects a suitable one. Again, however, the routes or paths have some similarity or symmetry, such as being at the same data rate.

The arrival of SDH has coincided with an increase in the use of rings, and several protection schemes for use in rings are already known. To date, known schemes restrict the protection to within the ring, or extend it outside the ring in a generally symmetrical fashion.

A situation arises in which a single network node (the "dependant" node) is required to have a very high security of connection to a ring. Although traffic within the ring can be protected by known means such as are referred to above, traffic to and from the ring can normally be protected automatically only by replication of the connections between it and one equipment on the ring. Any other arrangement would normally result in the control difficulties mentioned above, and automatic protection is likely to be slow.

If speed response is not a constraint then ideally, there would be connections between the node and two or more equipments on the ring, so that if one were to fail, traffic to and from the ring would survive. Such an equipment is referred to here as a parent, and the arrangement to be described is known as dual parenting. The purpose of this invention is to provide a very fast protection means in this case.

BRIEF DESCRIPTION OF THE DRAWINGS

In order that the invention may be fully understood, it will now be described with reference to the seven figures of the accompanying drawings. In the drawings

In FIGS. 1 and 2 traffic is shown between (a) and (d). FIG. 1 shows the traffic in the direction (a) to (d) and FIG. 2 shows this in the reverse direction from (d) to (a). FIGS. 3 and 4 show how an alternative protection path can be provided between (a) and (d) after failure of the shortest protection path between them. FIG. 3 corresponds to FIG. 1 and FIG. 4 to FIG. 2 as far as the direction of traffic is concerned.

DETAILED DESCRIPTION OF THE PREFERRED EMBODIMENTS

Figure 1:
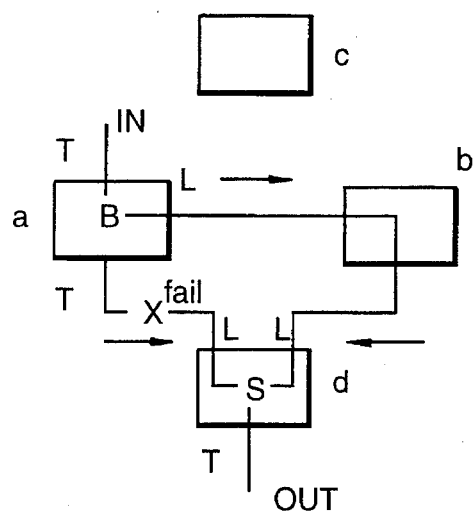
FIGS. 1 to 4 show the more significant aspects of the network implementation.

In the figures the reference L is the line, T is the tributary, S is the select from two inputs and B is the bridge to two outputs from one input, X shows a failure in the normal path and the various boxes indicate ADMs. It must be appreciated the key inventive step is the application of protection between line (L) and tributary (T) ports in an ADM, and will now be described in more detail.

A known and particularly flexible protection means is one in which parity and other information is compared between two incoming signals from the two paths of a ring, and the failed signal is rejected. In particular, portions—such as individual 2 Mbit/s signals plus their overhead bits in SDH—of the two Incoming aggregate signals are individually compared in pairs, each portion with its own parity and other information, so that individual portions may be selected from either path. (In SDH, such portions are referred to a "virtual containers").

This known approach has the advantage that the loss of an individual portion, which can result from failure of particular devices, need not cause the whole aggregate signal to be selected Instead from the other path. Such a change in selection would normally produce a disturbance to communications because of the difference in propagation delay between the two paths, causing digital systems to temporarily lose alignment after they experience a sudden time-shift in their received data. It is undesirable to apply such a disturbance to portions of traffic which were not faulty, in order to restore portions which have failed.

The scheme just described is applied between the two paths of a ring, or can be extended over any two paths. However, the general requirement for symmetry or similarity in paths still applies, for ease or speed of control. In particular, the line ports and the tributary ports of an ADM are generally different in many ways. For example, because there are normally several tributaries, the function of an ADM means that the data rate of each tributary must be less than the aggregate line rate.

(An exception occurs where a tributary port uses a higher clock rate than the data which it contains, corresponding to only a proportion of timeslots in the aggregate tributary signal being loaded. This may be referred to as "depleted" mode, indicating that only some portions of the aggregate signal are present. This arrangement can allow some similarity between the characteristics of line and tributary ports, but the internal architecture of an ADM is essentially asymmetrical between line and tributary ports.)

The present invention applies protection between ports which are at different aggregate bit rates, by selection between individual portions of payload within the aggregate signals, each pair of mutually protective portions have the same nominal traffic capacity.

The various differences between tributary and line ports in an ADM—of which a difference in bit rates is one example—mean that protection is not currently provided by pairing one of each type of port to support alternative paths with fast automatic protection between them. It is possible in principle to design for protection to be provided in this way, but the apparent complications and the lack of an apparent need for this arrangement have prevented it from being Implemented, so far as is known.

In one possible implementation of the invention, each portion of each incoming signal has its overheads examined for excessive parity errors or other indications of a fault. Indicator flags are raised for each portion which falls to meet its preset performance criteria, and flags are compared in pairs within dedicated processors. The result of each comparison then operates a traffic selection switch operating on the individual portions. In this arrangement the functional differences between line and tributary ports have negligible effect on the design of the protection arrangement, and protection can be applied as easily between different line ports as between line and tributary ports.

This invention uses different types of ports in this way, in order to provide dual connections to a dependant node connected to the ring, with the advantages which are described below. Referring to FIG. 1, in the invention the node (d) establishes connection with one parent ADM (a) by using a direct path via the second parent ADM (b) and along the ring to the first ADM, normally taking the shortest path in the ring.

An example to illustrate a significant advantage of the invention is where a parent ADM (a) is connecting traffic between the dependent node (d) and one of the tributaries (t) of the parent ADM (a).

Figure 2:
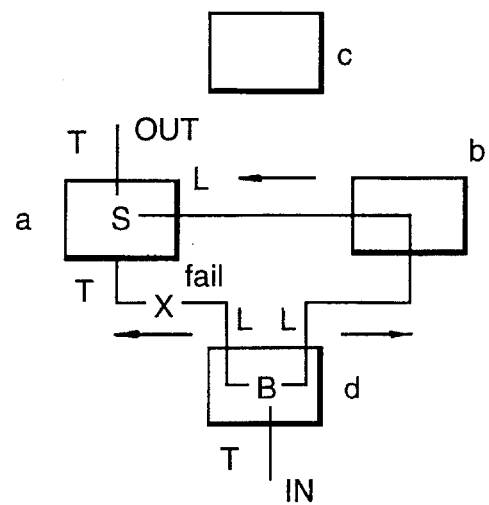

In order to provide protection, the first parent (a) in FIG. 2 must be able to select from two incoming signals, one on the ring and one on its tributary connected to the dependant node (d), and then deliver the selected traffic to the customer on tributary (T). This is not possible on existing designs, and selection can only be made in existing known ADMS from the two line ports, ie. from the two paths of the ring. This is shown in FIG. 6 to which reference is now made, this shows that traffic from (d), intended for (T) must first enter the ring via (a) and (b), then traverse the ring so as to enter the first ADM (a) from both paths of the ring.

Figure 6:
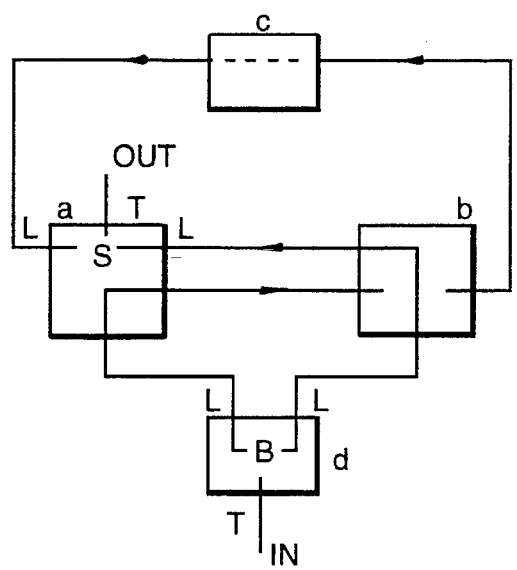

Comparing FIG. 6 with FIG. 2 it can be seen that FIG. 6 is wasteful of ring capacity, particularly if the customer traffic at (a) which is to be connected to node (d) is a significant proportion of the total ring traffic, as would often be the case. Such a case could arise because this node could be an urban network centre, and the parent ADMs, being nearest to it on the ring, are likely also to be in an urban area and therefore to have customers with high traffic demands. In this case the need to carry all such traffic all the way around the ring in order for the dependent node to have secure connections into the ring, would significantly increase the total traffic capacity needed in the ring, and would increase its cost.

Figure 5:
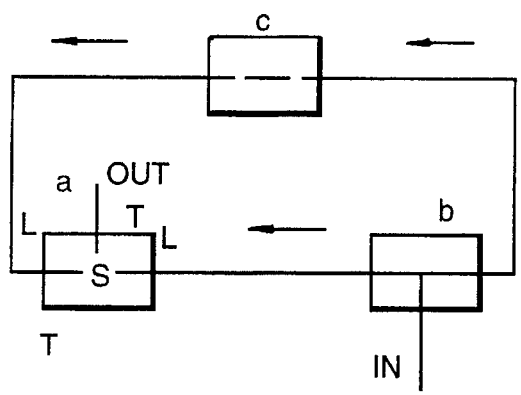
In FIG. 5 the connections for intra-ring traffic are shown and FIG. 6 shows protection by selection between line ports at (a).

This situation should not be confused with the need to carry all intra-ring traffic around the whole ring in order to provide alternative paths within the ring, as shown in FIG. 5, to which reference is now made. This is a separate requirement for traffic once it has entered the ring via an ADM. The purpose of the invention is to prevent the need for additional node-to-parent traffic also to travel all around the ring, rather than just on the shortest path between the two parent ADMs (a) and (b).

An advantage of the invention is that the two directions of duplex traffic for each signal can pass along the same route. This allows maintenance staff to take equipment (which commonly has both directions of transmission on common units) out of service without causing disruption. Prior to the invention, the waste of capacity within the ring could only be minimised when using existing selection means by causing the two directions of traffic for each duplex signal to travel on different paths in the ring. Where this is unacceptable for operational reasons, then both directions of traffic must pass wastefully around the ring, in order to maintain commonality of routing for both directions.

In summary, in an SDH network, the traffic between node and parents, as well as that in the ring, is likely to be in SDH form. This means that it contains the required parity and other information for comparison to be made between two paths. In the present invention, the parent ADM (a) in FIG. 2 selects between two nominally identical portions, one coming directly from the node via a tributary, and one coming via the ring. For the other direction of traffic, the node (d) simply selects between its two incoming signals, as in FIG. 1.

Figure 3:
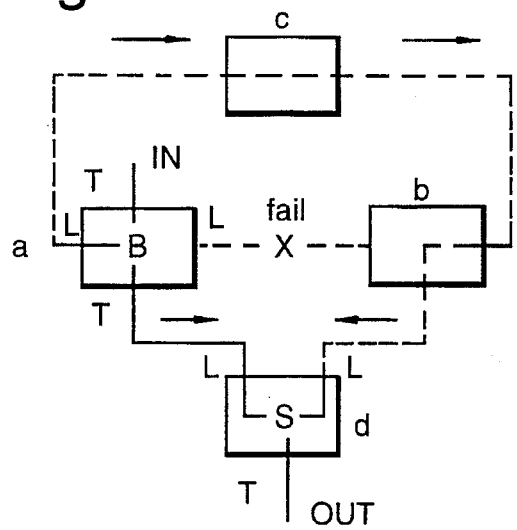
Figure 4:
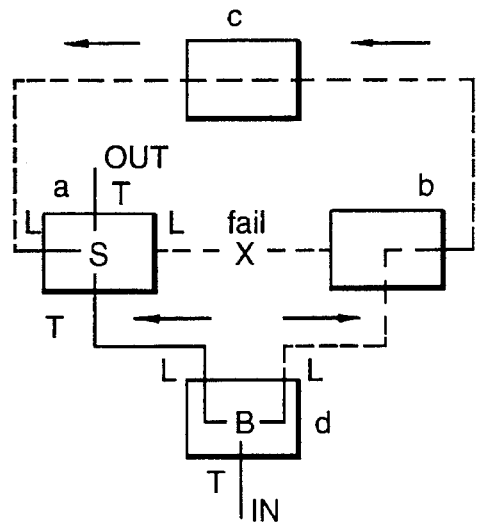

As a refinement, detection of a failure such as between (a) and (b) can be used by a Network Manager automatically to set up an alternative arrangement as shown in FIGS. 3 and 4, to which reference is now made. This maximises the probability that traffic connections will be maintained, by ensuring that two alternative paths will exist with automatic restoration possible between them. Such a network change would not normally be as rapid as the original restoration by a single ADM such as at (a), because of the extra complexity involved in commands to multiple ADMs, but it would improve the average availability of traffic connections.

The present invention also applies to cross-connects, which in general are more flexible than ADMs in their traffic muting options, but do not generally have the specific features required for operation in rings.

An ADM may have some of the features of a cross-connect. In the extreme case of a true cross-connect, all ports may be treated alike internally, The automatic selection of incoming traffic between two such ports would not be inventive. (In practice such automatic selection is generally restricted to apply across only limited groups of ports at a time, for fast automatic selection to exist, because of the control complexity of a more flexible arrangement.)

However, so far as is known, such fast automatic selection/protection arrangements within cross-connects currently apply to the whole payload signal on each port, by simple selection between ports, rather than applying to portions of each payload signal, individually controlled. (Here "payload" refers to that part of the aggregate signal which is to be transmitted onwards; the remainder would typically consist of overheads associated with the aggregate, and would normally be terminated and recreated for further transmission.)

Figure 7:
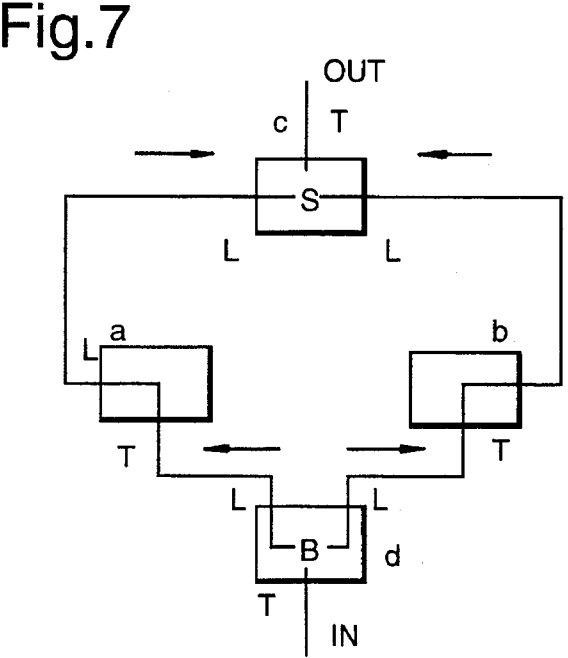
FIG. 7 shows the dual routes for traffic from (d) to (c).

In the present invention, the selection process may be applied uniquely to each individual portion of the signal which flows between node and parent. This is because the SDH line between node and parent may also carry portions of traffic for other ADMs on the ring, and the detailed routing and protection switching arrangement needed for them is different, for optimum use of ring capacity. Referring now to FIG. 7, this shows that traffic from (d) to (c) does not need to invoke protection switching at (a) or (b), nor to use the short section of ring between (a) and (b).

A further advantage arises from a significant difference between ADMs and cross-connects, The resilient transfer of timing within a ring requires special features in equipment within a ring, and cross-connects are not yet known to have such features. UK patent application 9106101.0 (Publication No. 2253973) describes particular examples of them in an ADM which provides some cross-connect capability. These features are required only on the line (ring) ports of an ADM, and therefore not all ports on a cross-connect would in future need to be fitted with them.

In a cross*connect which is operating within a ring, ie. as an ADM, any group of ports within it which may support these features for ring operation would not be associated for protection purposes with other ports used as tributaries in the ADM function, unless it were operating according to this invention. Accordingly protection switching would not currently apply between the two groups of ports.

If protection were to be applied between these two types of ports in a cross-connect, then it would fall within the scope of this invention, irrespective of whether the protection switching selection were to be applied to the whole or to a part of each aggregate signal.

I claim:

1. A method of protecting data in a data transmission system having a ring network of parent Add-Drop Multiplexors (ADMs) each connected to one another by means of respective line ports, each parent ADM having a tributary port to allow access to the ting network by a dependent node, at least one dependent node being connected to a tributary port of two parent ADMs such that incoming traffic signals can pass between said dependent node and a first one of said parent ADMs either directly via a tributary port of said first parent ADM or via a second parent ADM and a line port of said first parent ADM, said method comprising the steps of: comparing, within said first parent ADM, quality representative data from the dependent node within the incoming traffic signals on each of the line and tributary ports with each other; and selecting which of the incoming traffic signals to route to a destination as a result of the outcome of that data comparison.

2. The method according to claim 1, and further comprising the step of examining bits of overhead data within the incoming traffic signal on each of the line and tributary ports so as to check for errors.

3. The method according to claim 2, and further comprising the steps of raising an indicator flag in respect of each bit of examined overhead data which fails to meet preset performance criteria; comparing the flags raised for the incoming traffic signals on the line and tributary ports; and selecting the line or tributary port to be used for routing the incoming traffic signals as a result of that flag comparison.

4. The method according to claim 1, in which the ring network is a Synchronous Digital Hierarchy (SDH) network.

* * * * *